United States Patent
Bishop et al.

(10) Patent No.: US 8,102,154 B2
(45) Date of Patent: Jan. 24, 2012

(54) ENERGY SOURCE ISOLATION AND PROTECTION CIRCUIT FOR AN ELECTRONIC DEVICE

(75) Inventors: Dennis P. Bishop, Van Nuys, CA (US); Jon M. Spurlin, Northridge, CA (US)

(73) Assignee: Medtronic Minimed, Inc., Northridge, CA (US)

( * ) Notice: Subject to any disclaimer, the term of this patent is extended or adjusted under 35 U.S.C. 154(b) by 666 days.

(21) Appl. No.: 12/204,540

(22) Filed: Sep. 4, 2008

(65) Prior Publication Data

US 2010/0052619 A1    Mar. 4, 2010

(51) Int. Cl.
    *H02J 7/00* (2006.01)
(52) U.S. Cl. ......... 320/136; 320/157; 320/162; 323/234
(58) Field of Classification Search ............... 320/136, 320/134, 149, 148, 157, 162
    See application file for complete search history.

(56) References Cited

U.S. PATENT DOCUMENTS

| | | | |
|---|---|---|---|
| 5,583,384 A | 12/1996 | Henry | |
| 5,672,952 A | 9/1997 | Szepesi | |
| 6,249,106 B1* | 6/2001 | Turner et al. | 320/136 |
| 6,291,973 B1 | 9/2001 | Lee | |
| 6,388,426 B1* | 5/2002 | Yokoo et al. | 320/136 |
| 2006/0001404 A1* | 1/2006 | Ziegler et al. | 320/150 |
| 2006/0208850 A1* | 9/2006 | Ikeuchi et al. | 340/5.8 |
| 2007/0040449 A1 | 2/2007 | Spurlin et al. | |
| 2008/0015421 A1* | 1/2008 | Penner | 600/300 |
| 2009/0179618 A1* | 7/2009 | LiTingTun | 320/136 |

FOREIGN PATENT DOCUMENTS

EP    13433241 A1    9/2003

OTHER PUBLICATIONS

PCT Search Report for PCT/US2009/049434, Nov. 5, 2009, Medtronic Minimed, Inc.
PCT Written Opinion for PCT/US2009/049434, Nov. 5, 2009, Medtronic Minimed, Inc.

* cited by examiner

*Primary Examiner* — Arun Williams
(74) *Attorney, Agent, or Firm* — Ingrassia Fisher & Lorenz, P.C.

(57) ABSTRACT

An energy source isolation and protection circuit is provided for an electronic device, such as a patient-worn or patient-carried medical device. The isolation and protection circuit includes a supply voltage rail, a reference voltage rail, an electrical load coupled across the supply voltage rail and the reference voltage rail, and an energy source for supplying a voltage to the electrical load via the supply voltage rail and the reference voltage rail. The isolation and protection circuit also includes a voltage-controlled switch architecture that is configured to detach and electrically isolate the energy source from the electrical load (and from itself) in response to the voltage of the energy source falling below a threshold voltage. The voltage-controlled switch architecture is also designed to maintain the energy source in the detached and electrically isolated state in the absence of operating voltage provided by the energy source to the voltage-controlled switch architecture.

8 Claims, 4 Drawing Sheets

ENERGY SOURCE ISOLATION AND PROTECTION CIRCUIT FOR AN ELECTRONIC DEVICE

TECHNICAL FIELD

Embodiments of the subject matter described herein relate generally to electronic devices. More particularly, embodiments of the subject matter relate to protection circuits for energy sources such as rechargeable batteries.

BACKGROUND

The prior art is replete with portable electronic devices that are powered by rechargeable energy sources such as batteries. Portable consumer grade electronic devices have become ubiquitous in modern society; such devices include digital media players, mobile telephones, personal digital assistants, handheld video games, and the like. Moreover, portable electronic devices are commonly used for medical applications and systems. For example, the following types of medical devices can be implemented in a battery-powered platform: a wearable fluid infusion pump; a portable patient monitor device; a controller for a patient-worn medical device; or the like.

Certain types of rechargeable batteries (e.g., lithium ion and lithium polymer batteries) used in small electronic equipment can be susceptible to damage caused by overcharging or over-discharging (i.e., an undercharge condition). Usually, an external charger component includes the logic, circuits, and hardware needed to prevent an overcharging condition. However, protection against over-discharging is generally considered to be the responsibility of the user or the host device itself. In this regard, supervisory devices or circuits are typically integrated into electronic devices for purposes of monitoring the battery voltage and possibly other state of charge conditions associated with the battery.

A supervisory circuit electrically disconnects the battery from the load when the battery charge is low. Unfortunately, conventional battery supervisory circuits remain electrically connected to the monitored battery, even after the battery has been disconnected from the primary load. In other words, the supervisory circuit itself remains a current-drawing load on the battery even though the battery has been disconnected from the load. Consequently, the supervisory circuit itself can cause the battery to lose charge and voltage over time. As a result, the health and lifespan of the battery can be negatively affected by such a supervisory circuit.

BRIEF SUMMARY

An energy source isolation and protection circuit is provided for an electronic device. The circuit includes a supply voltage rail, a reference voltage rail, and an energy source having a positive terminal, a negative terminal, and an energy source voltage defined between the positive terminal and the negative terminal. The circuit also includes an electrically controlled switch coupled between the positive terminal and the supply voltage rail, and a control circuit coupled to the supply voltage rail, the reference voltage rail, and the electrically controlled switch. The energy source voltage serves as an operating voltage for the control circuit. When the energy source voltage drops below a threshold voltage, the control circuit opens the electrically controlled switch to isolate the energy source. This isolation also removes the energy source voltage from the control circuit.

The above and other aspects may be carried out by an embodiment of a battery isolation and protection circuit for an electronic device having a supply voltage rail, a reference voltage rail, a load coupled between the supply voltage rail and the reference voltage rail, and a rechargeable battery having a positive terminal and a negative terminal. The circuit includes a voltage comparator having a first input coupled to the supply voltage rail, a second input coupled to the reference voltage rail, and an output. The voltage comparator is configured to generate a relatively high voltage at the output when a voltage across the first input and the second input is greater than a threshold voltage, otherwise, the voltage comparator generates a relatively low voltage at the output. The circuit also includes an NMOS transistor having its gate node coupled to the output and its source node coupled to the reference voltage rail, and a pull-down resistor coupled between the output and the reference voltage rail. The circuit further includes a PMOS transistor having its gate node coupled to the drain node of the NMOS transistor, its drain node coupled to the supply voltage rail, and its source node coupled to the positive terminal of the rechargeable battery. In addition, a pull-up resistor is coupled between the drain node of the NMOS transistor and the positive terminal of the rechargeable battery.

A method for isolating an energy source for an electronic device is also provided. The energy source has a positive terminal and a negative terminal, and the electronic device has a supply voltage rail, a reference voltage rail, a load between the supply voltage rail and the reference voltage rail, and a transistor-based switch coupled between the supply voltage rail and the positive terminal of the energy source. The method involves monitoring a load voltage defined between the supply voltage rail and the reference voltage rail, the load voltage being supplied by the energy source when the transistor-based switch is closed, and detecting when the load voltage falls below a threshold voltage. In response to the detection of the falling load voltage, the switch is opened to electrically isolate the energy source from the load. Moreover, the switch is maintained in its open state until an external stimulus causes the transistor-based switch to close.

Another embodiment of an energy source isolation and protection circuit for an electronic device is provided. The circuit includes a supply voltage rail, a reference voltage rail, an electrical load coupled across the supply voltage rail and the reference voltage rail, and an energy source for supplying a voltage to the electrical load via the supply voltage rail and the reference voltage rail. The circuit also includes a voltage-controlled switch architecture configured to detach and electrically isolate the energy source from the electrical load, and from itself, in response to the voltage of the energy source falling below a threshold voltage. The voltage-controlled switch architecture is further configured to maintain the energy source in the detached and electrically isolated state in the absence of operating voltage provided by the energy source to the voltage-controlled switch architecture.

An electronic device is also provided. The electronic device has a supply voltage rail, a reference voltage rail, an electrical load between the supply voltage rail and the reference voltage rail, an energy source for supplying a voltage to the electrical load via the supply voltage rail and the reference voltage rail, a means for detecting when the voltage supplied by the energy source falls below a threshold voltage, and a means for electrically isolating the energy source from the electrical load. The means for electrically isolating is responsive to detection of the voltage falling below the threshold voltage. The electronic device also includes a means for preserving the energy source in its electrically isolated state until an externally applied voltage that exceeds the threshold voltage is established between the supply voltage rail and the reference voltage rail.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
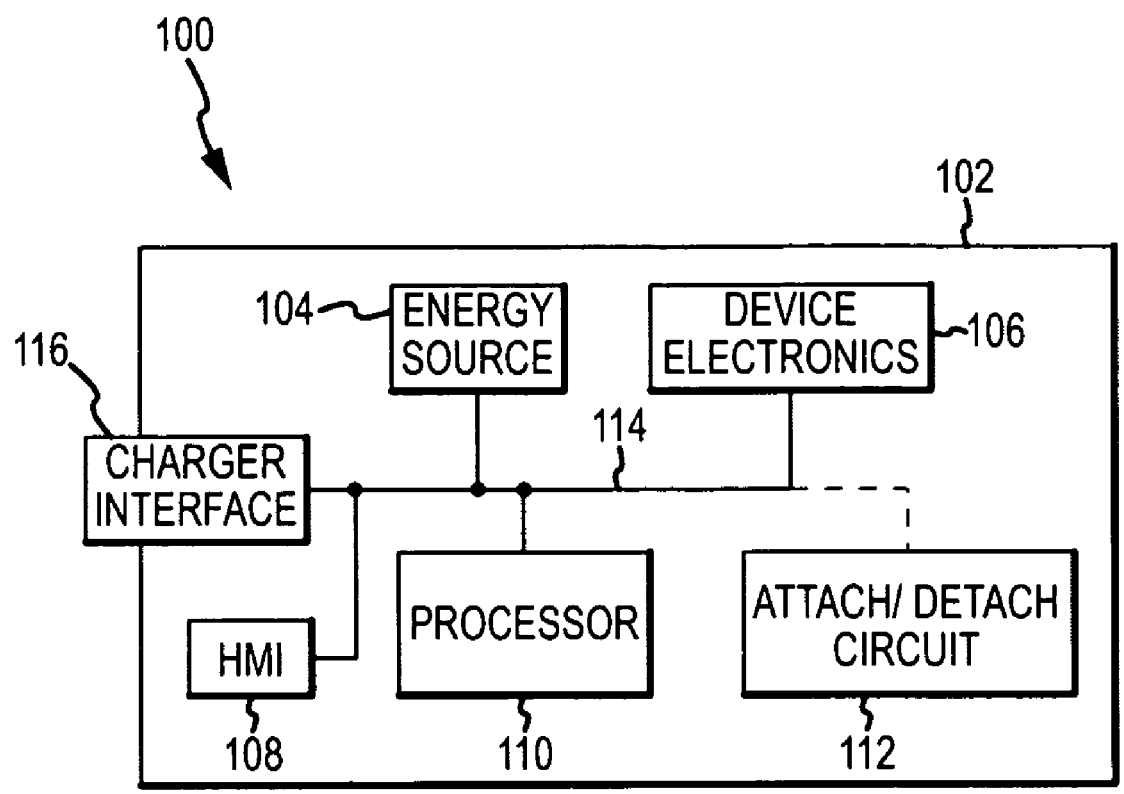
FIG. 1 is a block diagram representation of an embodiment of an electronic device having an energy source isolation and protection feature.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various components or devices. It should be appreciated that the various block components shown in the figures may be realized by any number of hardware, software, and/or firmware components configured to perform the specified functions.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1-4 depict exemplary arrangements of elements, additional intervening elements, devices, features, or components may be present in an embodiment of the depicted subject matter.

A portable electronic device having a replaceable or rechargeable energy source (e.g., a rechargeable lithium-ion battery) may include an energy source isolation and protection feature as described herein. The isolation and protection feature may be implemented in the form of a battery detach/attach circuit that disconnects the battery from its load under low charge/voltage conditions. Notably, the circuit is suitably configured such that it also disconnects the supervisory circuit component that initiates the load disconnection. In other words, after detaching and isolating the battery, no components or elements remain functionally coupled to the battery. This feature is desirable to extend the life and health of the battery by minimizing further charge loss before the battery can be recharged. When the battery disconnection state is maintained, only trace amounts of leakage current will be drawn from the battery. Although leakage current is undesirable and inevitable, the leakage is insignificant compared to the current that would otherwise be needed to continue operating a supervisory circuit chip or controller element.

In preferred embodiments, after the battery has been detached and electrically isolated, it will remain in that state unless some form of outside influence or intervention initiates reattachment of the battery. For example, if an external charger for the energy source is coupled to the electronic device, then the supervisory control circuit and the load will be electrically connected to the battery, thus enabling recharging of the battery and continued monitoring of the battery charge/voltage. Other examples of external stimuli or intervention include, without limitation: user manipulation of a button or other human-machine interface element; detection of an optically transmitted signal; reception of a wireless control signal; detection of a predetermined environmental temperature; detection of a magnetic field; or control by an external circuit or subsystem.

FIG. 1 is a block diagram representation of an embodiment of an electronic device 100 having an energy source isolation and protection feature integrated therein. An embodiment of electronic device 100 may be realized as a fluid infusion pump worn or carried by a patient, a controller for a medical device, a monitor for a medical device, or the like. Other embodiments of electronic device 100 may be realized as a consumer-based product, e.g., a digital media player, a portable video game device, a mobile telephone, or the like. These and other practical form factors may be considered in a deployment of electronic device 100. FIG. 1 depicts electronic device 100 in a simplified manner that generalizes certain functional modules of electronic device 100. It should be appreciated that a practical deployment of electronic device 100 may include a number of additional components, operational modules, features, and elements configured to support the operation of electronic device.

Electronic device 100 generally includes, without limitation: a housing 102; an energy source 104; device electronics 106; a human-machine interface (HMI) 108; a processor 110; and an attach/detach circuit 112 (also referred to herein as an isolation and protection circuit). These and possibly other components or elements of electronic device 100 may be coupled to each other using an interconnect structure 114 that accommodates supply voltages, data communication, control signals, and the like. Certain embodiments of electronic device 100 may also include a charger interface 116 having electrical and physical specifications that are compatible with an external charger (not shown).

Energy source 104 represents the primary power supply for electronic device 100. In preferred embodiments, energy source 104 is a rechargeable source such as a battery, a capacitor, or a supercapacitor. Applications that require long shelf life typically utilize lithium-ion, lithium-polymer, or other lithium-based batteries, and energy source 104 may be realized using such a rechargeable battery. As explained in more detail below, energy source 104 can be suitably configured to provide operating voltage and current to other components of electronic device 100, including device electronics 106, HMI 108, processor 110, and attach/detach circuit 112. In accordance with one implementation where electronic device 100 is a portable infusion pump, energy source 104 provides a nominal voltage of about 3.7 volts, and can sustain operation of electronic device 100 even when its voltage drops to about 3.2 volts. Of course, different operating voltage characteristics and specifications may apply to other embodiments of electronic device 100.

Device electronics 106 represents application-specific and/or deployment-specific circuits, integrated circuit chips, hardware, firmware, electrical components, etc., and device electronics 106 are suitably configured to support the functions, operations, and features of electronic device 100. In other words, the intended functionality of electronic device is provided at least in part by device electronics 106. Device electronics 106, or a section thereof, may represent an electrical load seen by energy source 104.

HMI 108 may represent hardware, software, firmware, processing logic, or any combination thereof that allows a user to interact with electronic device 100. HMI 108 can be any device, component, or function that enables the user to select options for electronic device 100, input information to electronic device 100, receive information from electronic device 100, or control the operation of electronic device. For example, HMI 108 may include, without limitation: a keypad; keys; buttons; switches; knobs; a touchpad; a joystick; a display element; a pointing device; a virtual writing tablet; indicator lights; or the like. In some embodiments, HMI 108 can be used to manually detach or manually attach energy source 104 for electrical isolation and protection purposes.

Processor 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform functions and operations for electronic device 100. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Attach/detach circuit 112 is suitably configured to attach (electrically couple) and detach (electrically decouple) energy source 104 from the electrical load that is normally driven by energy source 104. Depending upon its implementation, attach/detach circuit 112 may include various electrical components such as resistors, transistors, a control circuit, a voltage comparator, etc. In FIG. 1, the dashed line leading to attach/detach circuit 112 schematically indicates that attach/detach circuit 112 itself can be electrically isolated and detached from energy source 104 such that it does not draw any appreciable current from energy source 104 when energy source 104 is in a protected state. This characteristic of electronic device 100 is explained in more detail below.

The illustrated embodiment uses charger interface 116 for connection to an external charger unit for energy source 104. In this regard, charger interface 116 represents the hardware, software, firmware, and/or processing logic needed for compatibility with the external charger unit. As depicted in FIG. 1, at least a portion of charger interface 116 may be accessible on or through housing 102 to accommodate coupling of the external charger unit to electronic device 100. Thus, charger interface 116 enables the user to recharge energy source 104 as needed. As described in more detail below, coupling of an external charger unit to charger interface 116 may cause electronic device 100 to automatically switch from a first mode (where energy source 104 is electrically isolated) to a second mode (where energy source 104 is electrically coupled to operate electronic device 100).

Figure 2:
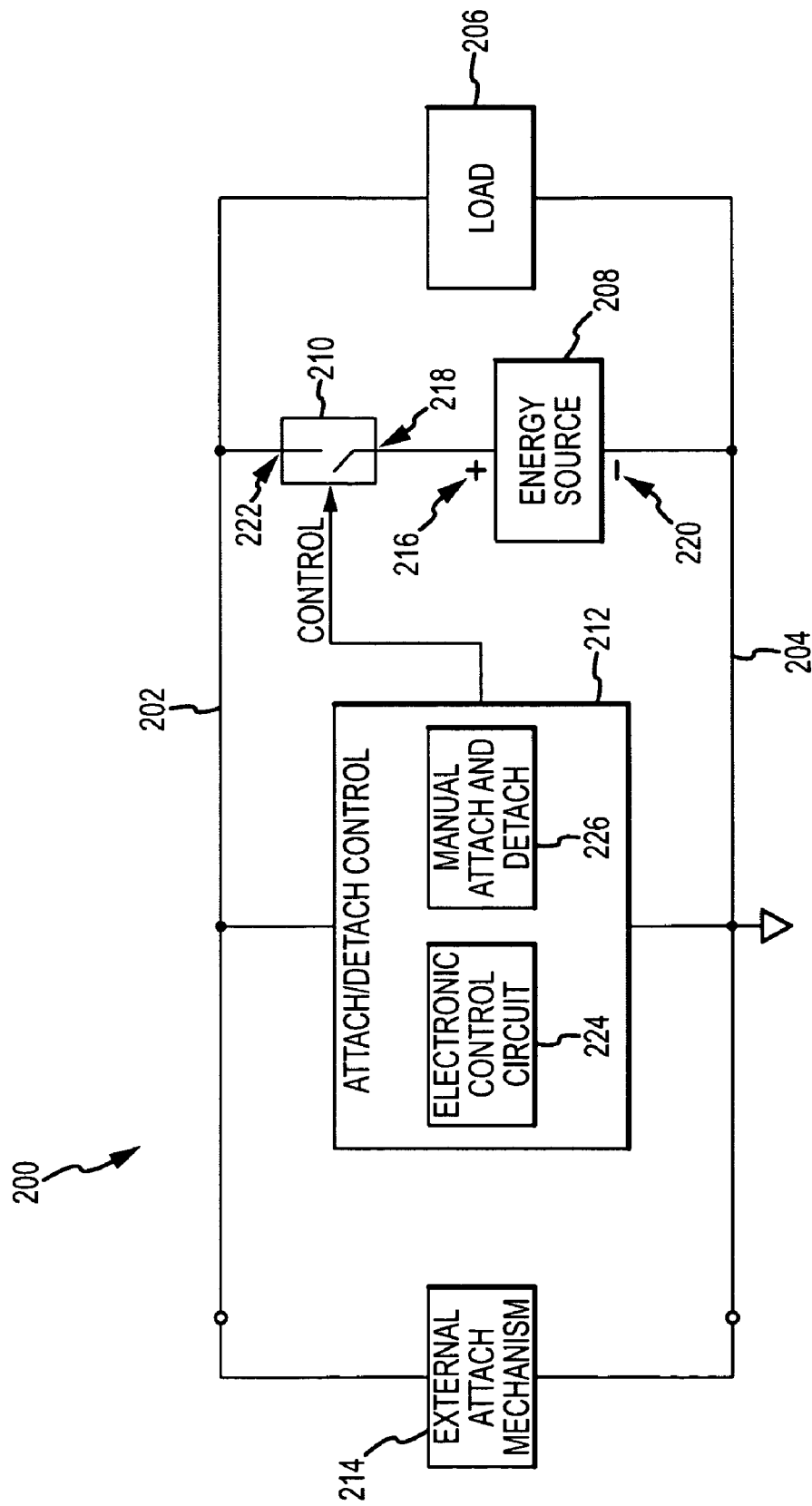
FIG. 2 is a functional block representation of an embodiment of an electronic device having an energy source isolation and protection feature.

FIG. 2 is a functional block representation of an embodiment of an electronic device 200 having an energy source isolation and protection feature integrated therein. FIG. 2 focuses on the isolation and protection circuit of electronic device 200, and other elements and modules of electronic device 200 (such as those depicted in FIG. 1) are not illustrated in FIG. 2. Electronic device 200 may include, without limitation: a supply voltage rail 202; a reference voltage rail 204; an electrical load 206; an energy source 208; an electrically controlled switch 210; and an attach/detach control architecture 212. The illustrated embodiment of electronic device 200 is suitably configured to interface or interact with an external attach mechanism 214, which can be utilized as an external stimulus to attach energy source 208 in the manner described in more detail below.

Energy source 208 may be realized as a supercapacitor or a battery (e.g., a rechargeable battery, a replaceable battery, or a non-replaceable battery intended for use with a disposable implementation of electronic device 200). As mentioned above, preferred embodiments of electronic device 200 employ a lithium-based rechargeable battery for energy source 208. Energy source has a positive terminal 216, which is coupled to a first end 218 of switch 210, and a negative terminal 220, which is coupled to reference voltage rail 204 (in an alternate embodiment 13 not shown here 13 the switch element could be located between the negative terminal of the energy source and the reference voltage rail). The energy source voltage is defined between its positive terminal 216 and its negative terminal 220.

The potential between supply voltage rail 202 and reference voltage rail 204 represents the nominal operating voltage for electronic device 200. In this regard, reference voltage rail 204 typically corresponds to the circuit ground potential. Thus, electrical load 206 is coupled between supply voltage rail 202 and reference voltage rail 204 such that energy source 208 can drive or power electrical load 206 when switch 210 is closed. In practice, electrical load 206 represents the circuit components, conductive traces, and other elements of electrical device that present an impedance to energy source 208. When switch 210 is closed, energy source 208 supplies voltage to electrical load 206 via supply voltage rail 202 and reference voltage rail 204.

A second end 222 of switch 210 is coupled to supply voltage rail 202. In other words, switch 210 is coupled between supply voltage rail 202 and the positive terminal 216 of energy source 208. Thus, when switch 210 is closed, energy source 208 is attached and introduced between supply voltage rail 202 and reference voltage rail 204 and, consequently, coupled across electrical load 206. In this normal operating mode, the energy source voltage corresponds to the rail-to-rail voltage (not considering any voltage drop through switch 210 or through any interconnect resistance). When switch 210 is open, energy source 208 is detached and electrically isolated from electrical load 206. In other words, electrical load 206 will not draw any operating current from energy source 208 in such a detached mode.

Attach/detach control architecture 212 may be implemented using integrated circuit chips, electrical components, transistors, hardware devices, firmware, processing logic, digital logic components, or the like. Attach/detach control architecture 212 is suitably configured and arranged to control the operation (i.e., opening and closing) of switch 210. The illustrated embodiment employs an electrically controlled switch 210 that is regulated by attach/detach control architecture. In this regard, attach/detach control architecture 212 generates an appropriate control signal, voltage, current, instruction, bit, or digital word as its output (labeled CONTROL in FIG. 2). Thus, attach/detach control architecture 212 can be coupled to switch 210 to facilitate switching control.

Attach/detach control architecture 212 is also configured to detect an undercharge condition of energy source 208, e.g., when the voltage supplied by energy source 208 falls below a specified threshold voltage. In response to such an undercharge condition, attach/detach control architecture 212 causes switch 210 to open, thus transitioning electronic device 200 from its normal operating mode (during which energy source 208 is attached to electrical load 206) to its detached mode (during which energy source 208 is electrically isolated). Moreover, attach/detach control architecture 212 is also adapted to initiate the transition from the detached mode back to the normal operating mode. In this regard, attach/detach control architecture 212 may be designed to react to an outside/external stimulus provided by external attach mechanism 214, and to control the closing of switch 210 in response to that external stimulus. Thus, an appropriate external stimulus (i.e., an input, a detectable condition, a user-initiated command, a user-activated button, a coupling of electronic device 200 to another device, or the like) can be used to reattach energy source 208.

Depending upon the embodiment, attach/detach control architecture 212 may include at least one electronic control circuit 224, at least one manual attach and detach device 226, or a combination thereof. A manual attach and detach device 226 may be realized as an HMI component (see above description of HMI 108) that allows the user to manually initiate attachment or isolation of energy source 208 as needed. Preferred embodiments utilize an electronic control circuit 224 that monitors the voltage across supply voltage rail 202 and reference voltage rail 204 and opens or closes switch 210 as needed to place electronic device 200 into its detached mode or its normal operating mode, respectively.

An implementation of electronic device 200 that utilizes an electronic control circuit 224 for attach/detach control architecture 212 is suitably configured and arranged such that electronic control circuit 224 itself is isolated from energy source 208 while in the detached mode. This characteristic improves the isolation of energy source 208 and further reduces the amount of current drawn from energy source 208 during the detached mode. By isolating electronic control circuit 224 in this manner during the detached mode, energy source 208 does not provide any operating voltage or current to electronic control circuit 224.

Figure 3:
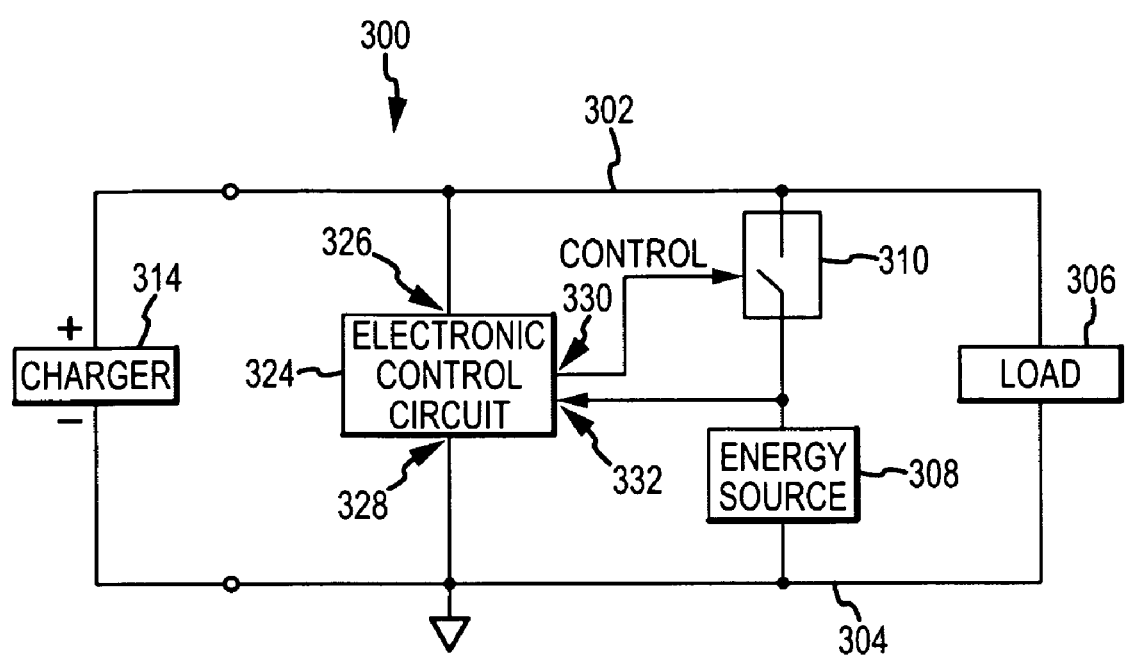
FIG. 3 is a functional block representation of an exemplary embodiment of an electronic device having an energy source isolation and protection feature that responds to an external charger.

FIG. 3 is a functional block representation of an exemplary embodiment of an electronic device 300 having an energy source isolation and protection feature that responds to an external charger. Electronic device 300 generally includes, without limitation: a supply voltage rail 302; a reference voltage rail 304; an electrical load 306 between the rails; an energy source 308; an electrically controlled switch 310; and an electronic control circuit 324. The illustrated embodiment of electronic device 300 can be connected to an external charger 314 for purposes of recharging energy source 308 as needed. Many of the components and features of electronic device 300 are similar or identical to counterpart components and features described above for electronic device 200. Such common aspects will not be redundantly described here in the context of electronic device 300.

Electronic control circuit 324 has a first input 326 coupled to supply voltage rail 302, a second input 328 coupled to reference voltage rail 304, an output 330 coupled to switch 310, and a third input 332 coupled to energy source 308. This particular embodiment of electronic control circuit 324 generates a control voltage at the output 330, and the control voltage influences the state of switch 310. When switch 310 is closed, the voltage provided by energy source 308 serves as the drive voltage for electrical load 306 and as an operating voltage for electronic control circuit 324. More specifically, the energy source voltage powers electronic control circuit 324, which in turn monitors the energy source voltage (defined between supply voltage rail 302 and reference voltage rail 304) at its first input 326 and its second input 328.

In response to the energy source voltage dropping below a specified threshold voltage, electronic control circuit 324 opens switch 310 to isolate energy source 308, and to also remove energy source 308 from electronic control circuit 324. In practice, electronic control circuit 324 can monitor the input 332 and utilize internal logic, voltage comparators, or the like, to keep switch 310 open as needed. Removing energy source 308 from electronic control circuit 324 in this manner effectively shuts down electronic control circuit 324 to render it nonoperational. Notably, even though electronic control circuit 324 is shut down, it still maintains the switch 310 in an open state. This open state is preserved until an external voltage supply (such as external charger 314) applies a voltage higher than the threshold voltage across supply voltage rail 302 and reference voltage rail 304. FIG. 3 depicts a scenario where external charger 314 has been connected across supply voltage rail 302 and reference voltage rail 304. Under this condition, electronic control circuit 324 will become operational if external charger 314 is providing a charge voltage that is higher than the minimum required operating voltage of electronic control circuit 324. If external charger 314 is providing a charge voltage that is higher than the stated threshold voltage, then electronic control circuit 324 will close switch 310 in response to the voltage applied by external charger 314. Closing of switch 310 facilitates charging of the energy source 308 with the externally applied voltage from external charger 314. As mentioned previously, coupling external charger 314 to electronic device 300 represents an external stimulus that initiates closing of switch 310.

Figure 4:
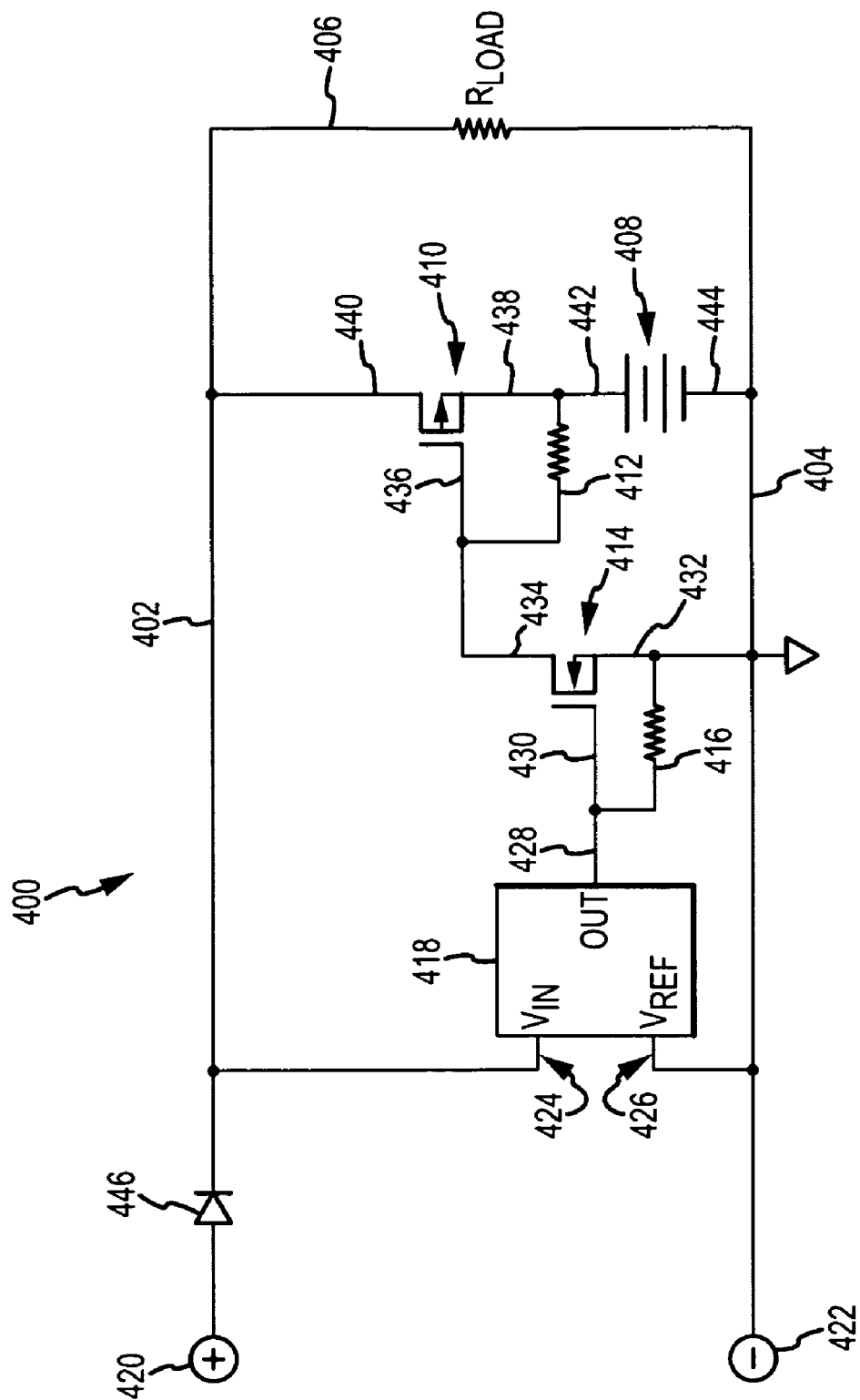
FIG. 4 is a circuit schematic representation of an exemplary embodiment of an electronic device having an energy source isolation and protection feature.

A practical implementation of electronic device 300 may employ one or more transistor-based switches in a voltage-controlled switch architecture. In this regard, FIG. 4 is a circuit schematic representation of an exemplary embodiment of an electronic device 400 having an energy source isolation and protection feature as described herein. Electronic device 400 generally includes, without limitation: a supply voltage rail 402; a reference voltage rail 404; an electrical load 406 between the rails; a rechargeable battery 408; a PMOS transistor 410; a pull-up resistor 412 for PMOS transistor 410; an NMOS transistor 414; a pull-down resistor 416 for NMOS transistor 414; and a voltage comparator 418. The illustrated embodiment of electronic device 400 can be connected to an external charger (not shown) via a positive charge terminal 420 and a negative charge terminal 422.

Many of the components and features of electronic device 400 are similar or identical to counterpart components and features described above for electronic device 200 and/or for electronic device 300. Such common aspects will not be redundantly described here in the context of electronic device 400.

Voltage comparator 418 has a first input 424 coupled to supply voltage rail 402, a second input 426 coupled to reference voltage rail 404, and an output 428. NMOS transistor 414 has its gate node 430 coupled to the output 428 and to one end of pull-down resistor 416, its source node 432 coupled to reference voltage rail 404 and to the other end of pull-down resistor 416, and its drain node 434 coupled to one end of pull-up resistor 412. Thus, pull-down resistor 416 is coupled between the output 428 of voltage comparator 418 and reference voltage rail 404. An inherent property of NMOS transistors is that very little trickle current can flow through the reverse biased inherent body diode when the source-drain junction is held open, and the isolation and protection circuit takes advantage of this property. Although leakage current (which is proportional to temperature) can flow in the reverse direction, such leakage current is much lower than typical operating currents. For instance, leakage current is typically less than about 200 picoamps. PMOS transistor has its gate node 436 coupled to the drain node 434 of NMOS transistor, its source node coupled to the other end of pull-up resistor 412, and its drain node 440 coupled to supply voltage rail 402. The positive terminal 442 of battery 408 is coupled to the source node 438 of PMOS transistor 410, and the negative terminal 444 of battery 408 is coupled to reference voltage rail 404. Thus, pull-up resistor 412 is coupled between the drain node 434 of NMOS transistor 414 and the positive terminal 442 of battery 408. An inherent property of PMOS transistors is that very little trickle current can flow through the reverse biased inherent body diode when the source-drain junction is held open, and the isolation and protection circuit takes advantage of this property. As depicted in FIG. 4, electrical load 406 is coupled between supply voltage rail 402 and reference voltage rail 404.

The combination of voltage comparator 418, NMOS transistor 414, pull-down resistor 416, PMOS transistor 410, and pull-up resistor 412 may be referred to herein as a voltage-controlled switch architecture for electronic device 400. This voltage-controlled switch architecture can be suitably configured to detach and electrically isolate battery 408 from electrical load 406 (and from itself) when the voltage of the battery 408 falls below a designated threshold voltage. The voltage-controlled switch architecture is preferably configured to maintain the battery 408 in its detached and electrically isolated state in the absence of operating voltage provided to it by the battery 408. In practice, battery 408 itself keeps PMOS transistor 410 in an open state because the gate-to-source voltage of PMOS transistor 410 is zero volts when the battery 408 is detached. Moreover, the voltage-controlled switch architecture can be configured to maintain the battery 408 in its detached and electrically isolated state until the voltage-controlled switch architecture is reset by some external stimulus. This embodiment responds to an external stimulus associated with the coupling of an external charger (not shown) between supply voltage rail 402 and reference voltage rail 404 (i.e., across positive charge terminal 420 and negative charge terminal 422). In practice, the external charger can apply an appropriate charging voltage across the rails, and that charging voltage can also serve as the operating voltage for the voltage-controlled switch architecture (or a portion thereof, such as voltage comparator 418).

The combination of voltage comparator 418, NMOS transistor 414, pull-down resistor 416, and pull-up resistor 412 represents one possible realization of an electronic control circuit as described above (e.g., electronic control circuits 224 and 324). As mentioned above, such an electronic control circuit can be utilized to electronically control switching between the detached and attached states for battery 408. For the embodiment illustrated in FIG. 4, the electronic control circuit opens and closes the transistor-based switch, which is implemented by PMOS transistor 410. In this regard, PMOS transistor 410 represents one realization of an electrically controlled switch as described above (e.g., switches 210 and 310).

The operation of the battery isolation and protection circuit for electronic device 400 will now be described with reference to FIG. 4. For purposes of this example, electronic device 400 is assumed to be in its normal operating mode. In other words, PMOS transistor 410 is on (i.e., the switch is closed) and battery 408 is coupled between supply voltage rail 402 and reference voltage rail 404, thus providing operating voltage to voltage comparator 418. In the normal operating mode, voltage comparator 418 functions as a voltage monitor element that monitors the rail-to-rail load voltage supplied by battery 408. More particularly, voltage comparator 418 obtains the difference between the voltage at its first input 424 (i.e., the voltage present at supply voltage rail 402) and the voltage at its second input 426 (i.e., the voltage present at reference voltage rail 404), and compares that voltage difference to a threshold voltage. In certain embodiments, voltage comparator 418 is realized as an integrated circuit component having a fixed threshold voltage. In other embodiments, voltage comparator 418 may be realized as an integrated circuit component having a plurality of selectable threshold voltages, or as an integrated circuit component having a variable or configurable threshold voltage. An exemplary embodiment specifies a threshold voltage of 2.93 volts, which accommodates a lithium-based rechargeable battery 408 having a nominal operating voltage of about 3.7 volts.

If the rail-to-rail battery voltage detected by voltage comparator 418 is greater than the threshold voltage, then voltage comparator 418 will generate a relatively high voltage at its output 428. This relatively high voltage is sufficient to activate NMOS transistor 414. For the exemplary embodiment described here, this relatively high voltage is approximately equal to the supply voltage (or any sufficient voltage to control NMOS transistor 414. For certain medical device applications, this voltage may be about 1.5 to 3.0 volts. In contrast, if the rail-to-rail battery voltage is not greater than the threshold voltage, then voltage comparator 418 will generate a relatively low voltage at its output 428. This relatively low voltage is sufficient to deactivate NMOS transistor 414. For the exemplary embodiment described here, this relatively low voltage is less than approximately 1.0 volt, preferably zero volts. Alternate embodiments of electronic device 400 may employ a high threshold voltage and a different low threshold voltage rather than only one designated threshold voltage as described here.

Assuming that the battery voltage is sufficiently high, the high output of voltage comparator 418 will keep NMOS transistor 414 on because the output of voltage comparator 418 corresponds to the gate voltage applied to NMOS transistor 414. Pull-down resistor 416 has a relatively high resistance that does not affect voltage comparator 418 or NMOS transistor 414 during the normal operating mode. For the exemplary embodiment described here, pull-down resistor 416 has a resistance within the range of about 10-12 MΩ. When NMOS transistor 414 is on (i.e., the switch is closed), its drain node 434 is pulled to ground potential. Consequently, the gate node 436 of PMOS transistor 410 will also be at ground potential. Thus, PMOS transistor 410 will be on (i.e., the switch is closed) due to the positive source-gate voltage established by the battery 408. Pull-up resistor 412 has a relatively high resistance that does not affect the operation of NMOS transistor 414 or PMOS transistor 410 during the normal operating mode. For the exemplary embodiment described here, pull-up resistor 412 has a resistance within the range of about 10-12 MΩ. The closed state of PMOS transistor 410 introduces battery 408 into the circuit, and allows battery 408 to drive electrical load 406. Notably, the closed state of PMOS transistor 410 also allows battery 408 to provide operating voltage and power to voltage comparator 418.

Voltage comparator 418 can continuously monitor the rail-to-rail voltage to determine if and when the battery voltage drops below the predetermined threshold voltage. Assuming that battery 408 eventually loses its charge and its voltage indeed falls below the threshold voltage, voltage comparator 418 will detect that undercharge condition. In response thereto, voltage comparator 418 will initiate a transition from the normal operating mode to the detached mode, during which the NMOS transistor 414 is switched off (i.e., opened), the PMOS transistor is switched off (i.e., opened), and battery 408 is electrically isolated.

As described above, voltage comparator 418 generates a relatively low voltage at its output 428 in response to the detection of the low battery voltage condition. This relatively low voltage causes NMOS transistor 414 to switch off due to insufficient gate-to-source potential. Pull-down resistor 416 ensures that NMOS transistor 414 is held in its off state whenever the output of voltage comparator 418 is not high, or (possibly) when not driven. When NMOS transistor 414 is off, its drain node 434 effectively becomes an open circuit, thus having no appreciable influence on the operation of PMOS transistor 410. Under these conditions, pull-up resistor 412 forces the voltage at the gate node 436 of PMOS transistor 410 to become approximately that of battery 408. Consequently, PMOS transistor 410 will be turned off (i.e., the switch is opened). The opened state of PMOS transistor 410 electrically isolates battery 408 from electrical load 406 and from voltage comparator 418. Thus, battery 408 can no longer drive electrical load 406 or provide operating voltage or current to voltage comparator 418. In this manner, the electronic control circuit of electronic device 400 is suitably configured to regulate the voltage at the gate node 436 of PMOS transistor 410 to control the switching state of PMOS transistor 410 and, in turn, to control whether electronic device 400 assumes its normal operating mode or its detached/isolated mode.

Once electronic device 400 enters its detached mode, it will remain in that mode until some external stimulus or action initiates the switching on of PMOS transistor 410. In other words, electronic device 400 will naturally preserve its detached state until some external action causes PMOS transistor 410 to be activated (i.e., the switch is closed). In this regard, a practical realization of voltage comparator 418 will generate no voltage at its output 428 when its operating voltage is removed 13 the output 428 will effectively be a floating node. In such a state, pull-down resistor 416 will maintain the gate node 430 of NMOS transistor 414 at ground potential, thus ensuring that NMOS transistor 414 remains off. This characteristic allows electronic device 400 to maintain the detached mode indefinitely. Even if battery 408 somehow raises its voltage above the threshold voltage, electronic device 400 will remain in its detached mode until influenced by appropriate outside intervention.

For the illustrated embodiment, only a trace amount of leakage current will flow through PMOS transistor 410 when electronic device 400 is in the detached mode. This leakage current is very low, perhaps about 200 picoamps or less, and the leakage current typically varies with temperature. This low leakage current is unavoidable but very tolerable. Indeed, an embodiment of electronic device 400 could idle in the detached mode for one to three years and not lose more than 100 micro-amp-hour due to the detach/attach circuit described here. Of course, any internal leakage of battery 408 itself will contribute to the reduction in overall shelf life and dissipation of battery 408. Thus, the estimated loss provided above is exclusive of internal battery leakage.

The exemplary embodiment described here responds to the coupling of an external charger (not shown in FIG. 4) across positive charge terminal 420 and negative charge terminal 422. For protection, electronic device 400 may include a diode 446 in series with positive charge terminal 420 (and/or a diode in series with negative charge terminal 422). Diode 446 may be desirable to ensure that current does not backflow into the external charger. When the external charger is connected to electronic device 400, the charge voltage may be sufficient to power voltage comparator 418. Assuming that the charge voltage is high enough to operate voltage comparator 418, then the voltage monitoring capability of voltage comparator 418 will again be activated.

If the external charge voltage is less than the stated threshold voltage being monitored by voltage comparator 418, then voltage comparator 418 will generate a low output and electronic device 400 will remain in its detached/isolated state. If, however, the external charge voltage is greater than the threshold voltage, then voltage comparator 418 will generate a high output and electronic device 400 will transition to its normal operating mode. As described above, this transition will correspond to the switching on of NMOS transistor 414, the switching on of PMOS transistor 410, and the coupling of battery 408 between supply voltage rail 402 and reference voltage rail 404. Eventually, after battery 408 has been sufficiently recharged, the external charger can be removed such that electronic device 400 can continue operating in its normal mode.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A battery isolation and protection circuit for an electronic device, the circuit comprising:
   a supply voltage rail;
   a reference voltage rail;
   an electrical load directly connected between the supply voltage rail and the reference voltage rail;
   a rechargeable battery having a positive terminal and a negative terminal directly connected to the reference voltage rail;
   a voltage comparator having a first input directly connected to the supply voltage rail, a second input directly connected to the reference voltage rail, and an output, the voltage comparator being configured to generate a relatively high voltage at the output when a voltage across the first input and the second input is greater than a threshold voltage, and to otherwise generate a relatively low voltage at the output;

an NMOS transistor having a gate node directly connected to the output of the voltage comparator, a source node directly connected to the reference voltage rail, and a drain node;

a pull-down resistor directly connected between the gate node of the NMOS transistor and the source node of the NMOS transistor, and directly connected between the output of the voltage comparator and the reference voltage rail;

a PMOS transistor having a gate node directly connected to the drain node of the NMOS transistor, a drain node directly connected to the supply voltage rail, and a source node directly connected to the positive terminal of the rechargeable battery; and a pull-up resistor directly connected between the gate node of the PMOS transistor and the source node of the PMOS transistor, and directly connected between the drain node of the NMOS transistor and the positive terminal of the rechargeable battery;

wherein the relatively high voltage at the output of the voltage comparator activates the NMOS transistor to place the drain node of the NMOS transistor and the gate node of the PMOS transistor at ground potential, and to activate the PMOS transistor to connect the rechargeable battery between the supply voltage rail and the reference voltage rail; and wherein the relatively low voltage at the output of the voltage comparator deactivates the NMOS transistor to establish an open circuit condition at the drain node of the NMOS transistor, and to deactivate the PMOS transistor to electrically isolate the rechargeable battery from the electrical load.

2. The circuit of claim 1, wherein the rechargeable battery is a rechargeable lithium ion battery.

3. The circuit of claim 1, wherein the rechargeable battery is a rechargeable lithium polymer battery.

4. The circuit of claim 1, wherein the electronic device has a normal operating mode during which a voltage across the positive terminal and the negative terminal of the rechargeable battery is greater than the threshold voltage, the voltage comparator generates the relatively high voltage at the output, the NMOS transistor is switched on, and the PMOS transistor is switched on.

5. The circuit of claim 4, wherein the electronic device has a detached mode during which the NMOS transistor is switched off, the PMOS transistor is switched off, and the rechargeable battery is electrically isolated.

6. The circuit of claim 5, wherein the electronic device transitions from the normal operating mode to the detached mode in response to the voltage across the first input and the second input of the voltage comparator falling below the threshold voltage.

7. The circuit of claim 6, wherein the electronic device remains in the detached mode until an external stimulus initiates switching on of the PMOS transistor.

8. The circuit of claim 7, wherein the external stimulus is associated with the coupling of an external charger between the supply voltage rail and the reference voltage rail.

* * * * *